United States Patent
Mirkin et al.

(10) Patent No.: US 12,388,622 B2
(45) Date of Patent: Aug. 12, 2025

(54) MASKING CIPHERTEXTS USING RANDOM ELEMENTS FOR SECURE DECRYPTION

(71) Applicant: International Business Machines Corporation, Armonk, NY (US)

(72) Inventors: Michael Mirkin, Tivon (IL); Allon Adir, Kiryat Tivon (IL); Ronen Levy, Haifa (IL); Ehud Aharoni, Kfar Saba (IL); Nir Drucker, Zichron Yaakov (IL); Eyal Kushnir, Kfar Vradim (IL)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 18/166,686

(22) Filed: Feb. 9, 2023

(65) Prior Publication Data
US 2024/0275579 A1    Aug. 15, 2024

(51) Int. Cl.
| H04L 29/00 | (2006.01) |
| H04L 9/06 | (2006.01) |
| H04L 9/08 | (2006.01) |
| H04L 9/30 | (2006.01) |

(52) U.S. Cl.
CPC .......... H04L 9/0618 (2013.01); H04L 9/0869 (2013.01); H04L 9/30 (2013.01)

(58) Field of Classification Search
CPC ....... H04L 9/0618; H04L 9/0869; H04L 9/30; H04L 9/008
See application file for complete search history.

(56) References Cited

U.S. PATENT DOCUMENTS

| 8,522,016 | B2 | 8/2013 | Taskaya et al. | |
| 9,590,951 | B2* | 3/2017 | Tomkow | H04L 63/0838 |
| 9,686,250 | B2 | 6/2017 | Barnett et al. | |
| 2005/0046817 | A1* | 3/2005 | Wolfe | G11B 7/24094 355/54 |
| 2005/0213752 | A1* | 9/2005 | Hawkes | H04L 9/065 380/28 |
| 2007/0192632 | A1* | 8/2007 | Botzum | G06F 21/62 713/193 |
| 2009/0055645 | A1* | 2/2009 | Park | H04L 43/0864 713/168 |
| 2009/0147957 | A1* | 6/2009 | Murray | H04L 63/0853 380/259 |
| 2009/0304179 | A1* | 12/2009 | Gressel | H04L 9/0643 380/268 |
| 2010/0287386 | A1* | 11/2010 | Feix | H04L 9/0662 713/193 |

(Continued)

OTHER PUBLICATIONS

Adriana Lopez-Alt et al., "On-the-Fly Multiparty Computation on the Cloud via Multikey Fully Homomorphic Encryption", IACR Cryptol, May 19, 2012, 73 pages.

(Continued)

*Primary Examiner* — Don G Zhao
(74) *Attorney, Agent, or Firm* — Kimberly Zillig (57) ABSTRACT

An example system includes a processor to mask a ciphertext using four random elements to generate masked ciphertexts. The processor can send the masked ciphertexts to a server device. The processor can receive masked plaintexts from the server device. The processor can unmask the masked plaintexts using the four random elements to generate unmasked plaintexts.

17 Claims, 6 Drawing Sheets

(56) References Cited

U.S. PATENT DOCUMENTS

| | | | |
|---|---|---|---|
| 2011/0113050 A1* | 5/2011 | Youn | G06F 21/6218 707/E17.124 |
| 2012/0159180 A1 | 6/2012 | Chase et al. | |
| 2012/0163585 A1* | 6/2012 | Choi | H04L 9/002 380/28 |
| 2015/0046450 A1* | 2/2015 | Yoshino | G06F 16/7837 707/736 |
| 2016/0110564 A1* | 4/2016 | Tsang | G06F 21/72 713/189 |
| 2017/0085534 A1* | 3/2017 | Iyer | H04L 63/0428 |
| 2018/0139055 A1* | 5/2018 | Brathwaite | H04L 9/3247 |
| 2018/0174493 A1* | 6/2018 | Ohori | H04L 9/0656 |
| 2018/0288005 A1* | 10/2018 | Brathwaite | G16B 15/20 |
| 2019/0130125 A1* | 5/2019 | Yoshino | H04L 9/06 |
| 2019/0166105 A1* | 5/2019 | Romain | H04L 9/085 |
| 2019/0215156 A1* | 7/2019 | Gammel | G06F 21/602 |
| 2019/0363870 A1* | 11/2019 | Wagner | H04L 9/008 |
| 2020/0228341 A1* | 7/2020 | Mohassel | H04L 9/3218 |
| 2022/0029803 A1* | 1/2022 | Vijayanarayanan | H04L 9/32 |
| 2022/0131698 A1* | 4/2022 | Badrinarayanan | H04L 9/085 |
| 2022/0414268 A1* | 12/2022 | Landry | G06F 21/72 |
| 2023/0208611 A1* | 6/2023 | Cheon | H04L 9/008 380/28 |
| 2023/0361986 A1* | 11/2023 | Genise | G06F 9/3887 |
| 2024/0137205 A1* | 4/2024 | Adir | H04L 9/3093 |
| 2024/0195618 A1* | 6/2024 | Paul | H04L 9/14 |
| 2024/0205015 A1* | 6/2024 | Kussmaul | G06F 16/2255 |

OTHER PUBLICATIONS

Chilaka Hari Krishna et al., "Two-Factor Data Security Protection Mechanism for Cloud Storage System", IRE Journals, vol. 1 Issue 9, Mar. 2018, 5 pages.

Tanping Zhou et al., "Multi-key Fully Homomorphic Encryption Scheme with Compact Ciphertexts", eprint.iacr.org, 2021, 27 pages.

Asharov et al., "Multiparty Computation with Low Communication, Computation and Interaction via Threshold FHE", Jun. 9, 2012, 48 pages, https://www.google.com/url?sa=t&rct=j&q=&esrc=s&source=web&cd=&cad=rja&uact=8&ved=2a[...]nt.iacr.org%2F2011%2F613.pdf&usg=AOvVaw2E2C3tuXRxoU9klvQk-3fO.

Kwak et al., "A General Framework of Homomorphic Encryption for Multiple Parties with Non-Interactive Key-Aggregation", Paper 2021/1412, Cryptology ePrint Archive, 2024, 22 pages, https://eprint.iacr.org/2021/1412.

Mouchet el al., "Multiparty Homomorphic Encryption from Ring-Learning-with-Errors", Proceedings on Privacy Enhancing Technologies, Oct. 2021, 18 pages.

\* cited by examiner

MASKING CIPHERTEXTS USING RANDOM ELEMENTS FOR SECURE DECRYPTION

BACKGROUND

The present techniques relate to fully homomorphic encryption (FHE) and decryption. More specifically, the techniques relate to the use of masks with FHE.

SUMMARY

According to an embodiment described herein, a system can include processor to mask a ciphertext using four random elements to generate masked ciphertexts. The processor can also further send the masked ciphertexts to a server device. The processor can also receive masked plaintexts from the server device. The processor can then unmask the masked plaintexts using the four random elements to generate unmasked plaintexts. Thus, the system provides a secure privacy-preserving decryption of ciphertexts. In some embodiments, the processor is to verify the unmasked plaintexts by comparing the unmasked plaintexts with each other. In these embodiments, the system enables verification that the unmasked plaintexts have not been modified after decryption. In some embodiments, the processor is to verify the unmasked plaintexts using a multiplicative inverse of a subset of the random elements. In these embodiments, the system enables efficient verification that the unmasked plaintexts have not been modified after decryption. In some embodiments, the processor is to receive an encrypted model and generate an encrypted quality score including the ciphertext via the encrypted model on user data using an evaluation public key. In these embodiments, the system enables the use of encrypted models on user data with security and privacy. In some embodiments, the processor is to receive an evaluation public key and encrypted model, generate an inference via the encrypted model on private data using the evaluation public key, and mask the encrypted inference to generate the ciphertext. In these embodiments, the system enables evaluation of encrypted models with security and privacy. In some embodiments, the encrypted model includes an encrypted shared model. In these embodiments, the system enables the use of shared models in an encrypted manner. In some embodiments, the encrypted shared model is encrypted using a threshold-multi-key encryption scheme. In these embodiments, the system enables the efficient use of shared models that are encrypted.

According to another embodiment described herein, a method can include masking, via a processor, a ciphertext using four random elements to generate masked ciphertexts. The method can further include sending, via the processor, the masked ciphertexts to a server device. The method can also further include receiving, via the processor, masked plaintexts from the server device. The method can also include unmasking, via the processor, the masked plaintexts using the four random elements to generate unmasked plaintexts. Thus, the method provides a secure privacy-preserving decryption of ciphertexts. In some embodiments, the method includes verifying, via the processor, the unmasked plaintexts by comparing the unmasked plaintexts with each other. In these embodiments, the method enables verification that the unmasked plaintexts have not been modified after decryption. In some embodiments, the method includes verifying, via the processor, the unmasked plaintexts using a multiplicative inverse of a subset of the random elements. In these embodiments, the method enables efficient verification that the unmasked plaintexts have not been modified after decryption. In some embodiments, the method includes receiving, via the processor, an encrypted model and generating, via the processor, an encrypted quality score including the ciphertext via the encrypted model on user data using an evaluation public key. In these embodiments, the method enables the use of encrypted models on user data with security and privacy. In some embodiments, the method includes receiving, via the processor, a public key and encrypted model, generating, via the processor, an inference via the encrypted model on private data using an evaluation public key, and masking, via the processor, the encrypted inference to generate the ciphertext. In these embodiments, the method enables evaluation of encrypted models with security and privacy. In some embodiments, the encrypted model includes an encrypted shared model. In these embodiments, the method enables the use of shared models in an encrypted manner. In some embodiments, the encrypted shared model is encrypted using a threshold-multi-key encryption scheme. In these embodiments, the method enables the efficient use of shared models that are encrypted.

According to another embodiment described herein, a computer program product for masking ciphertexts can include computer-readable storage medium having program code embodied therewith. The program code executable by a processor to cause the processor to mask a ciphertext using four random elements to generate masked ciphertexts. The program code can also cause the processor to send the masked ciphertexts to a server device. The program code can also cause the processor to receive masked plaintexts from the server device. The program code can also cause the processor to unmask the masked plaintexts using the four random elements to generate unmasked plaintexts. Thus, the computer program product provides a secure privacy-preserving decryption of ciphertexts. In some embodiments, the computer program product includes program code that causes the processor to verify the unmasked plaintexts by comparing the unmasked plaintexts with each other. In these embodiments, the computer program product enables verification that the unmasked plaintexts have not been modified after decryption. In some embodiments, the computer program product includes program code that can also cause the processor to verify the unmasked plaintexts using a multiplicative inverse of a subset of the random elements. In these embodiments, the computer program product enables efficient verification that the unmasked plaintexts have not been modified after decryption. In some embodiments, the computer program product includes program code executable by the processor to receive an encrypted model, and generate an encrypted quality score including the ciphertext via the encrypted model on user data using an evaluation public key. In these embodiments, the computer program product enables the use of encrypted models on user data with security and privacy. In some embodiments, the computer program product includes program code executable by the processor to receive an evaluation public key and encrypted model and generate an encrypted inference including the ciphertext via the encrypted model on private data using the evaluation public key. In these embodiments, the computer program product enables evaluation of encrypted models with security and privacy. In some embodiments, the encrypted model includes an encrypted shared model. In these embodiments, the computer program product enables the use of shared models in an encrypted manner.

DETAILED DESCRIPTION

In various applications, users may have ciphertexts including some encrypted plaintext that is to be decrypted via a server with a secret key. However, the users may not want the server to be able to see the plaintext or be able to efficiently change the plaintext. For example, the plaintext may be some sensitive data or secret data that is not to be shared.

According to embodiments of the present disclosure, system includes a processor that can mask a ciphertext using four random elements to generate masked ciphertexts. The processor can send the masked ciphertexts to a server device. The processor can receive masked plaintexts from the server device. The processor can unmask the masked plaintexts using the four random elements to generate unmasked plaintexts. In various embodiments, the encryption scheme is a Fully-Homomorphic Encryption (FHE) scheme. The user holding the ciphertext efficiently masks the encrypted value under FHE so that the server that decrypts the ciphertext can only see the masked value, and may thus not be able to efficiently modify the value that is masked. In particular, the ciphertext may actually be masked twice in a way that does not enable to server to efficiently modify both masked values consistently. In particular, the masking of the ciphertext C involves selecting 4 random values a1, b1, a2, b2. For example, the first mask may be represented as Mask1=a1*C+b1 and the second mask may be represented as Mask2=a2*C+b2. Thus, embodiments of the present disclosure allow a server holding the secret key to decrypt the masked ciphertexts for the user without the server learning or modifying the decrypted value. The embodiments described herein thus also enable a Multi-Key Fully-Homomorphic scheme to efficiently add new private evaluators after the set of key owners has been fixed. The embodiments described herein also further thus enable a model evaluation in which the model owner hides the model and the model evaluator hides the evaluation score.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
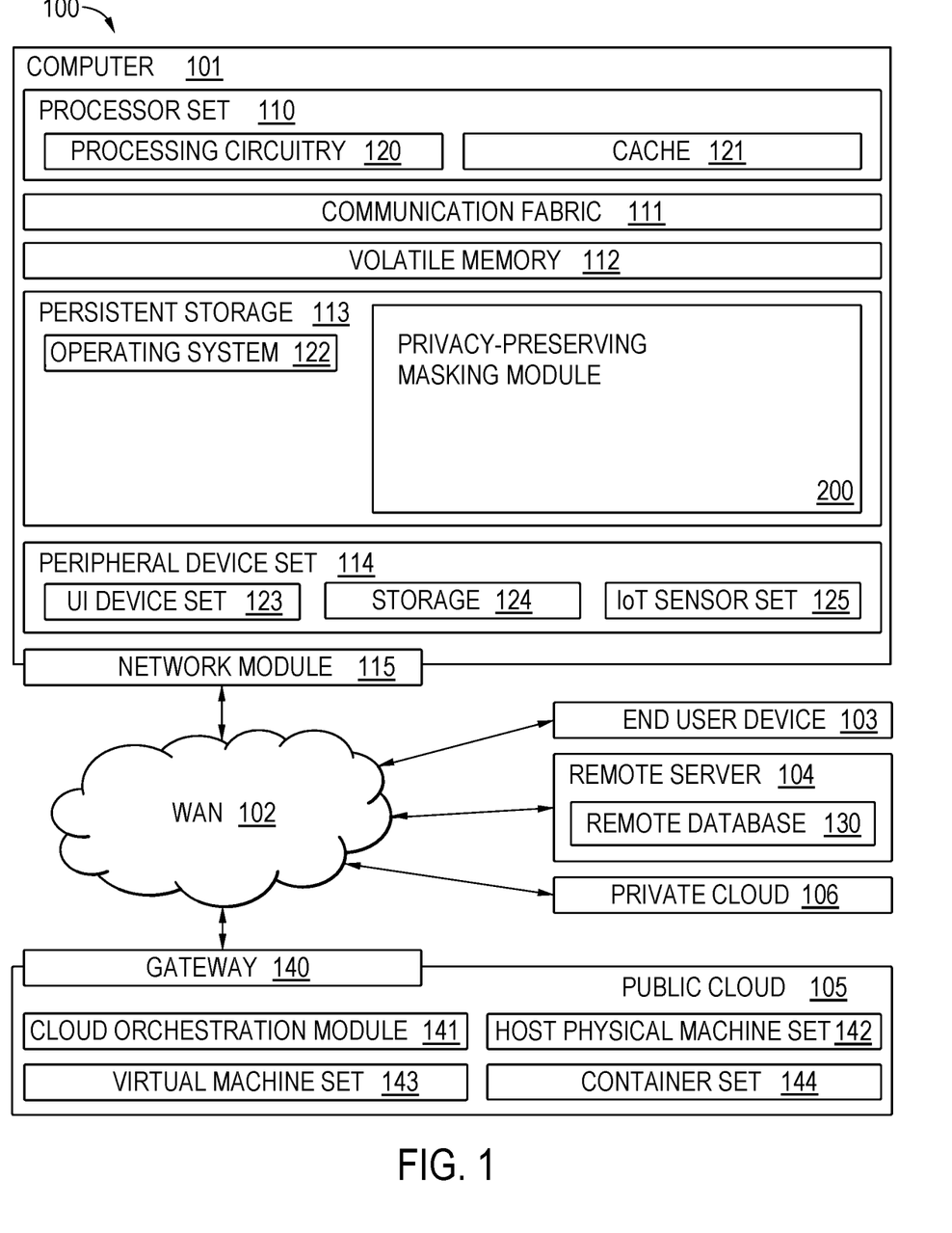
FIG. 1 is a block diagram of an example computing environment that contains an example of an environment for the execution of at least some of the computer code involved in performing the inventive methods, such as a privacy-preserving decryption module.

Computing environment 100 contains an example of an environment for the execution of at least some of the computer code involved in performing the inventive methods, such as privacy-preserving masking module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
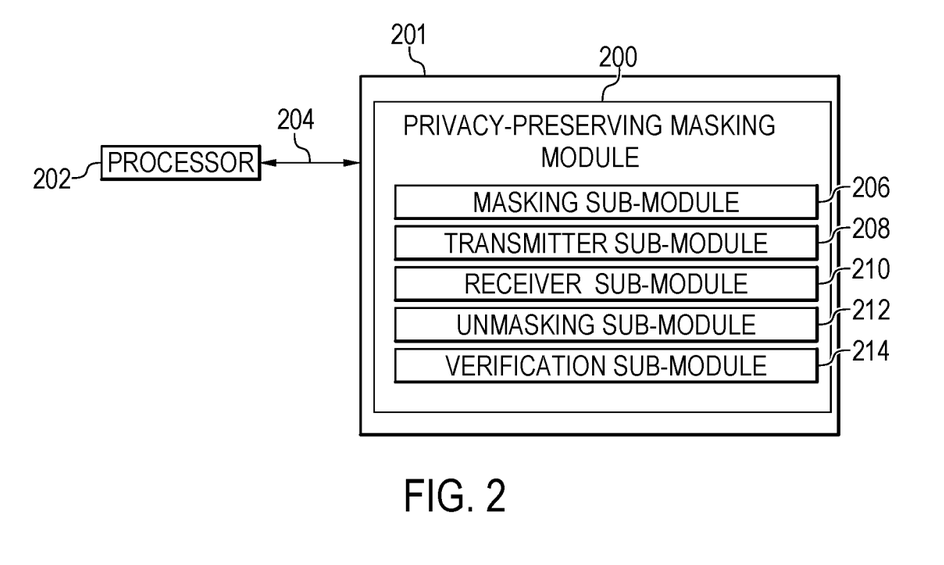
FIG. 2 is an example tangible, non-transitory computer-readable medium that can mask ciphertexts for secure decryption.

Referring now to FIG. 2, a block diagram is depicted of an example tangible, non-transitory computer-readable medium 201 that can mask ciphertexts under fully homomorphic encryption. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the methods 300 and 400 of FIGS. 3 and 4.

The various software components discussed herein may be stored on the tangible, non-transitory, computer-readable medium 201, as indicated in FIG. 2. For example, the privacy-preserving masking module 200 includes a masking sub-module 208 that includes code to mask a ciphertext using four random elements to generate masked ciphertexts. For example, the ciphertext may be an encrypted inference or an encrypted quality score generated using an encrypted model. The preserving masking module 200 also includes transmitter sub-module 208 that includes code to send the masked ciphertexts to a server device. The privacy-preserving masking module 200 includes a receiver sub-module 210 that includes code to receive masked plaintexts from the server device. The privacy-preserving masking module 200 includes an unmasking module 212 that includes code to unmask the masked plaintexts using the four random elements to generate unmasked plaintexts. The privacy-preserving masking module 200 includes a verification sub-module 214 that includes code to verify the unmasked plaintexts by comparing the unmasked plaintexts with each other. In various examples, the verification sub-module 214 that includes code to verify the unmasked plaintexts using a multiplicative inverse of a subset of the random elements.

In some embodiments, the computer-readable medium 201 may also further include a ciphertext generator module (not shown). In some examples, the ciphertext generator module can include code to receive an encrypted model and set of evaluation public keys, generate an encrypted quality score via the encrypted model on user data using the evaluation public keys. In some examples, the ciphertext generator module can include code to receive evaluation public keys and encrypted model, and generate an encrypted inference via the encrypted model on private data using the evaluation public keys to generate the ciphertext. For example, the encrypted model may be an encrypted shared model. In some examples, the encrypted shared model is encrypted using a threshold-multi-key encryption scheme. For example, the threshold-multi-key encryption scheme may be a threshold-FHE scheme, such as the scheme by Mouchet et al. first released in 2021, referred to herein as the Mouchet scheme, or the scheme by Asharov et al. first released on June 2012, herein referred to as the Asharov scheme.

Figure 3:
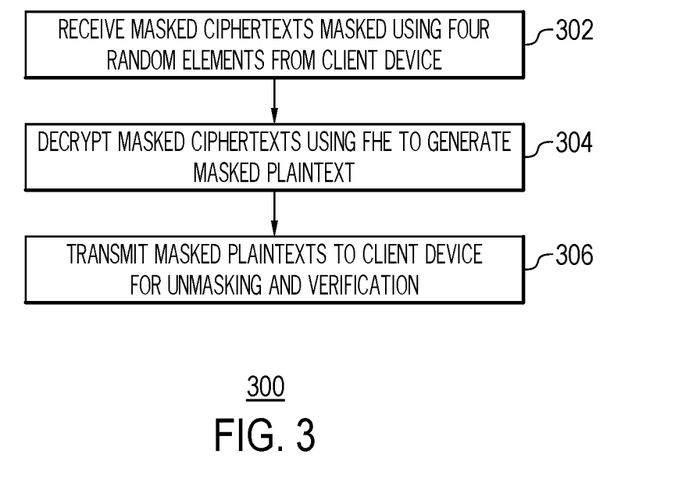
FIG. 3 is a process flow diagram of an example method that can securely decrypt mask ciphertexts under fully homomorphic encryption.

FIG. 3 is a process flow diagram of an example method that can securely decrypt masked ciphertexts under fully homomorphic encryption. The method 300 can be implemented with any suitable computing device, such as the computer 101 of FIG. 1. For example, the methods described below can be implemented by the processor set 110 of FIG. 1.

At block 302, masked ciphertexts masked using four random elements are received from a client device. For example, the masked ciphertexts may be a received at a service device providing a decryption service in association with an encrypted model used to generate the masked ciphertexts. In various examples, the ciphertexts may be encrypted using fully-homomorphic encryption, such as BGV or CKKS schemes, or similar schemes. In particular, the mathematical form of their encryption and ciphertext and the mathematical operations corresponding to the homomorphic operations enable computations described herein. For example, due to these aspects, a processor can directly compute C1 and C2 in BGV using homomorphic operations that use a1,a2,b1,b2 that are all integers <P of the finite field of the ciphertext. Thus, in BGV-like schemes, the four elements a1, b1, a2, and b2 may be selected in the plaintext space. The four elements a1, b1, a2, and b2 are used to generate the tuple: <C1=a1*C+b1, C2=a2*C+b2>. The tuple <C1,C2> is then sent to the server. In CKKS, the processor can use a1,a2 from the finite-field of the coefficients of the polynomials in the ciphertext, and b1, b2 that are themselves such polynomials. In CKKS, the ciphertext includes polynomials that are members of an algebraic structure, namely a Quotient Ring of Polynomials, over a Cyclotomic polynomial. In particular, in order to compute C1 and C2, the processor can use b1 and b2 that are also members of the same Quotient ring. In some examples, for FHE schemes like CKKS, a1 and a2 may instead be random scalars chosen from the finite-field of the plaintext coefficients rather than random plaintexts. As used herein, a1' and a2' are the multiplicative inverses of these scalars in that finite field.

At block 304, the masked ciphertexts are decrypted using fully homomorphic encryption (FHE) to generate a masked plaintext. For example, the server decrypts C1 and C2 and sends to the user the tuple: <P1=a1*P+b1, P2=a2*P+b2>.

At block 306, the masked plaintext is transmitted to the client device for unmasking and verification. For example, the client may execute the client device may execute the unmasking and verification as described in FIG. 4 below. Using the masking, the plaintext P may thus be not efficiently learnable with significant probability by the server even if the server is able to determine P1 and P2.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may include sending an encrypted model to the client device. In various examples, the method 300 may include sending a set of evaluation public keys to the client device.

Figure 4:
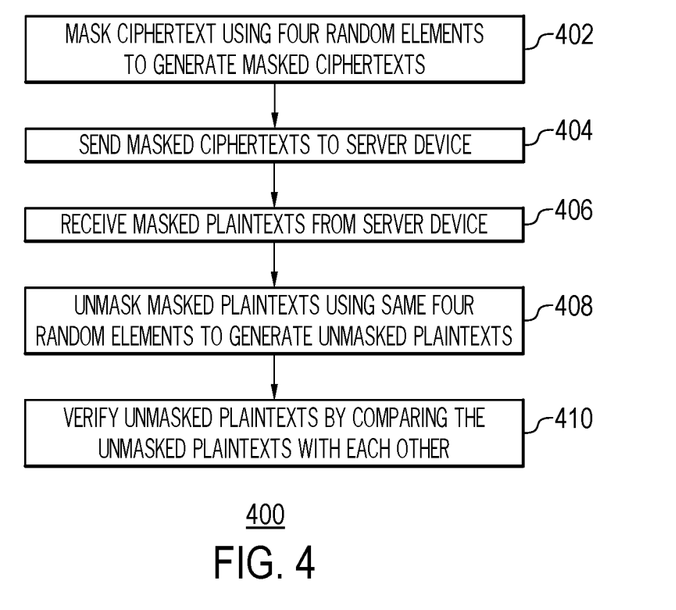
FIG. 4 is a process flow diagram of an example method that can mask ciphertexts for secure decryption under fully homomorphic encryption.

FIG. 4 is a process flow diagram of an example method that can mask ciphertexts for secure decryption under fully homomorphic encryption. The method 400 can be implemented with any suitable computing device, such as the computer 101 of FIG. 1. For example, the methods described below can be implemented by the processor set 110 of FIG. 1.

At block 402, ciphertexts are masked using four random elements. For example, the four random elements $a_1$, $b_1$, $a_2$, $b_2$, may be selected from the plaintext space in the case of BGV-like FHE schemes. In some examples, in the case of CKKS-like FHE schemes, the four random elements may include two random scalars $a_1$, and $a_2$, and two random elements from the plaintext space $b_1$ and $b_2$.

At block 404, the masked ciphertexts are sent to a server device. For example, the server device may then decrypt the masked ciphertexts using a secret key. In some examples, the secret key may be associated with one or more evaluation public keys used to generate the masked ciphertext.

At block 406, masked plaintexts are received from the server device. For example, the masked plaintexts may be received in response to sending the masked ciphertexts.

At block 408, the masked plaintexts are unmasked using the same four random elements to generate unmasked plaintexts. For example, the same four random elements $a_1$, $b_1$, $a_2$, $b_2$, may be used in the case of BGV-like FHE schemes. In some examples, in the case of CKKS-like FHE schemes, the same four random elements including the two random scalars $a_1$, and $a_2$, and two random elements from the plaintext space $b_1$ and $b_2$ may be used. In this manner, the client device can extract P from P1 and P2 using the four random elements $a_1$, $b_1$, $a_2$, $b_2$, which are known to the client device.

At block 410, the unmasked plaintexts are verified by comparing the unmasked plaintexts with each other. For example, the client device can compute $a_1'$=multiplicative inverse of $a_1$ and $a_2'$=multiplicative inverse of $a_2$. In various examples, the client device can then compute $P_1'=(P_1-b_1)*a_1'$ and $P_2'=(P_2-b_2)*a_2'$. If $P_1'!=P_2'$ then this implies that the server maliciously modified the encrypted value. Otherwise, $P=P_1'=P_2'$.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method 400 may include generating the ciphertext. In various examples, the method 400 may include receiving an encrypted model and a set of evaluation public keys and generating the ciphertext on private user data via the encrypted model using the evaluation public keys. For example, each of the valuation public keys may be associated with an operation to be performed under homomorphic encryption to generate the ciphertext.

Figure 5:
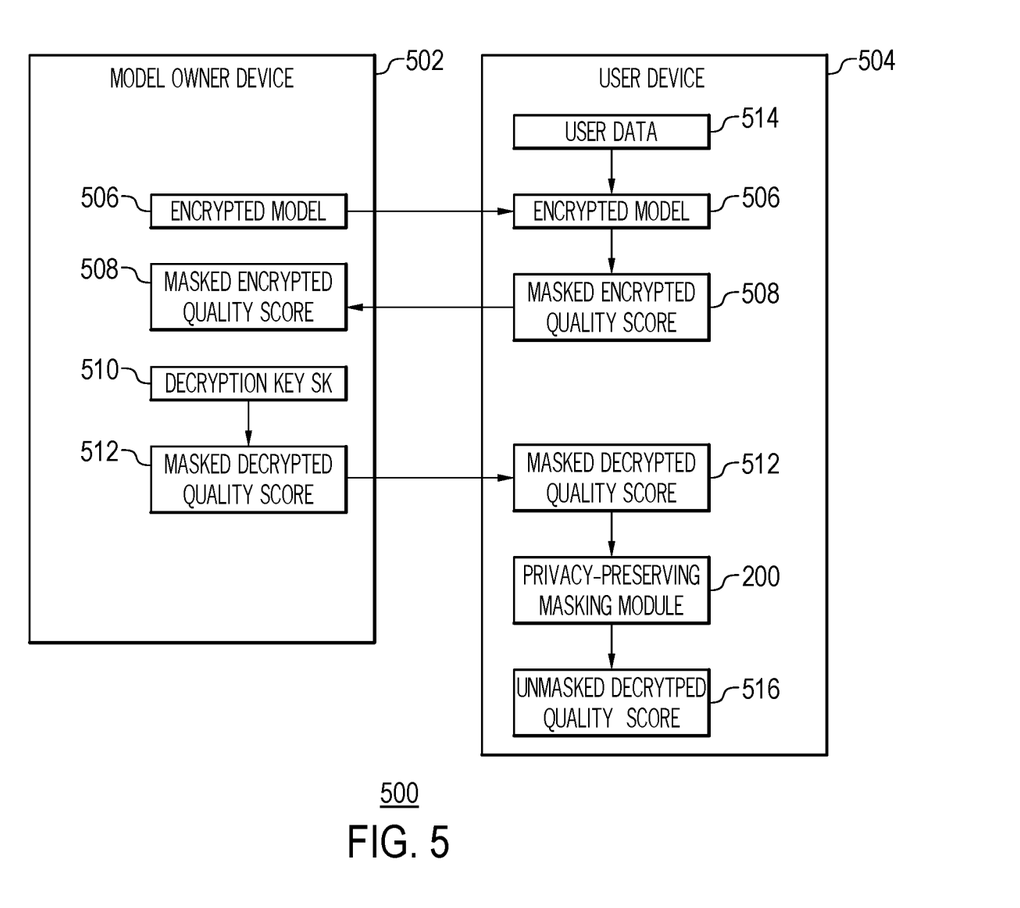
FIG. 5 is a block diagram of an example system for secure decryption of quality scores from an encrypted model.

With reference now to FIG. 5, a block diagram shows an example system for masking ciphertexts for decryption under fully homomorphic encryption. The example system is generally referred to by the reference number 500. FIG. 5 includes a model owner device 502 communicatively coupled to a user device 504. The model owner device 502 includes an encrypted model 506 and is shown receiving a masked encrypted quality score 508. The model owner device 502 further includes a decryption key 510 shown being used to generated a masked decrypted quality score 512. The user device 504 includes user data 514. The user data 514 is shown being used with a received encrypted model 506 to generate a masked encrypted quality score 508. The user device 504 further includes a privacy-preserving masking module 200. The user device 504 is shown receiving the masked decrypted quality score 512 and generating an unmasked decrypted quality score 516 using the privacy-preserving masking module 200.

In the example of FIG. 5, the model owner device 502 of the private model M send to the user an encryption of M under FHE: encrypted model M' 506. For example, the model owner publishes the encrypted model for evaluation by any number of potential customers, each having a user device 504. The model owner device 502 holds the secret decryption key SK 510.

In various examples, a user of the user device 502 may seek to evaluate the encrypted model 506 with private data referred to as user data 514. For example, the user device 502 can use fully homomorphic encryption (FHE) to locally compute an encrypted quality score for the encrypted model over the user's own user data 514. In various examples, the encrypted quality score may be an F1 score, or any other suitable score, such as precision and recall metrics. Thus, the user device 502 can evaluate the quality of M by using the encrypted model M' 506 for inference over a private dataset in user data 514 and computes a quality score such as F1'. The user device 504 performs this evaluation under FHE such that the resulting F1' score is also encrypted under the key of the model owner device 502. For example, the user device 504 may receive one or more evaluation public keys (not shown) for homomorphically evaluating an F1 score under FHE. Each of the evaluation public keys may correspond to a particular operation to be performed under FHE. The user device 502 may then mask the encrypted quality score according to embodiments herein to generate a masked encrypted quality score 508.

The user device 504 then obtains a masked decrypted quality score 512 by using the Privacy-Preserving Masking Module 200, where the model owner device 502 is the decrypting server. In particular, the model owner device 502 receives the masked encrypted quality score 508 and generates a masked decrypted quality score 512 using the decryption key 510. The model owner device 502 then transmits the masked decrypted quality score 512 to the user device 504 for unmasking. The user device 504 receives the masked decrypted quality score 512 and generates the unmasked decrypted quality score 516 via the privacy-preserving masking module 200. For example, the unmasked decrypted quality score 516 may be generated using the same random elements used to mask the masked encrypted quality score 508, according to embodiments described herein. Thus, the user device 504 learns the unmasked decrypted quality score F1 516 but not the model corresponding to encrypted model 506. Moreover, the model owner device 502 does not learn anything. For example, this includes not learning anything about the user data 514 and the unmasked decrypted quality score 516.

It is to be understood that the block diagram of FIG. 5 is not intended to indicate that the system 500 is to include all of the components shown in FIG. 5. Rather, the system 500 can include fewer or additional components not illustrated in FIG. 5 (e.g., additional user devices, or additional model owner devices, encrypted models, masked encrypted quality scores, etc.).

Figure 6:
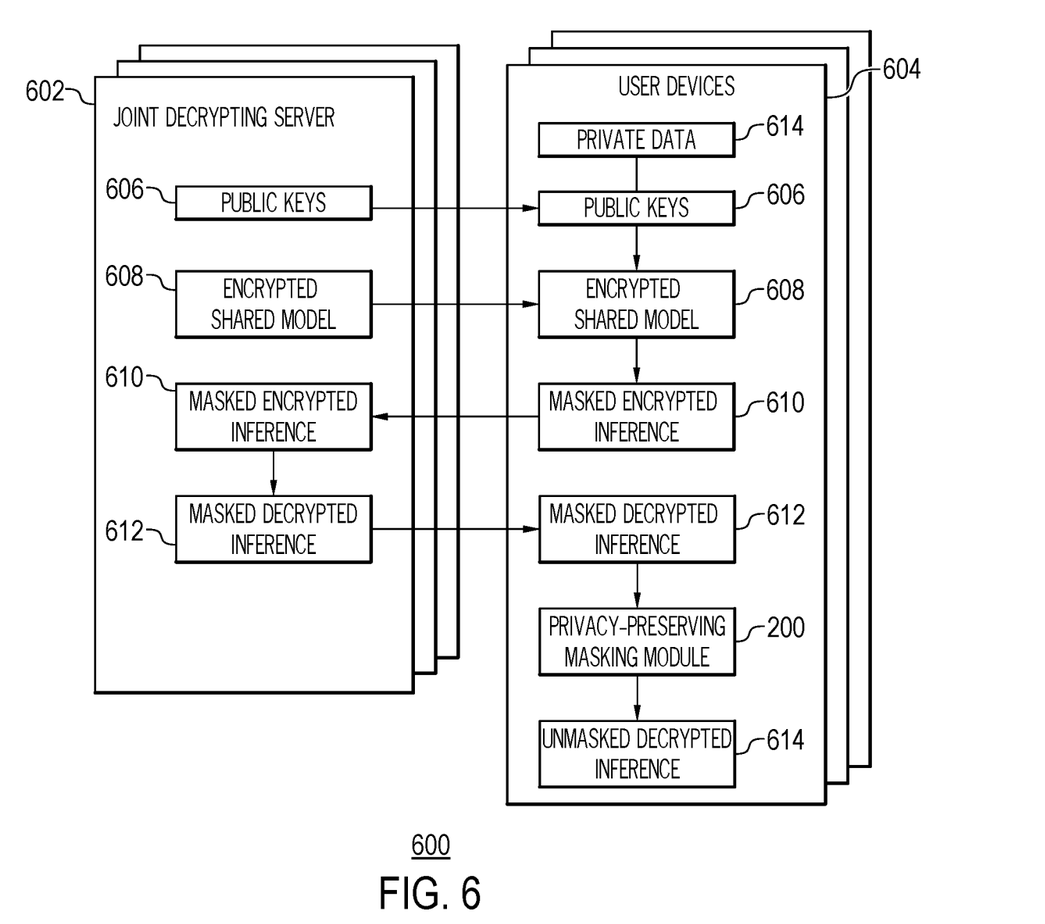
FIG. 6 is a block diagram of an example system for secure decryption of encrypted model inference results from a jointly encrypted model.

With reference now to FIG. 6, a block diagram shows an example system for masking ciphertexts for decryption under fully homomorphic encryption. The example system 600 of FIG. 6 includes a joint decrypting server 602. For example, the joint decrypting server 602 may include any number of server devices providing a decryption service. The system 600 further includes any number of user devices 604 communicatively coupled to the joint decrypting server 602. The joint decrypting server 602 includes public keys 606. The public keys 606 are a set of shared evaluation keys that enable the performance of specific operations under HE. For example, assuming there are 10 servers, and that there are 3 public keys needed for evaluation, then, as one example, one evaluation public key 606 may be used to perform multiplication, one public key 606 used to perform rotation by two slots, and one public key 606 to perform rotation by five slots. In this example, the 10 servers may share the same three evaluation public keys 606. In various examples, the joint decrypting server 602 may let the user devices 604 know of these evaluation public keys 606 either by sending the evaluation public keys 606 directly or by publishing the evaluation public keys 606 in some public venue. The joint decrypting server 602 further includes an encrypted shared model 608. For example, the encrypted shared model 608 may be encrypted using a private key related to the evaluation public keys 606. For example, the encrypted shared module 608 may be encrypted using a threshold-multi-key encryption scheme, such as the Mouchet or Asharov schemes, among others. The joint decrypting server 602 is shown receiving a masked encrypted inference 610 and generating a masked decrypted inference 612. For example, the masked decrypted inference 612 may be generated using a private key (not shown) corresponding to public keys 606. The user devices 604 each include their own private data 614. For example, the private data 614 may include information such as medical data, etc. The user devices 604 are shown receiving public keys 606 and encrypted shared model 608 and generating a masked encrypted inference 610. The user devices 604 are shown receiving a masked decrypted inference 612 and generating a decrypted inference 614 via the privacy-preserving masking module 200.

In the example of FIG. 6, the system 600 provides a threshold-multi-key encryption with a dynamic inference user set. In various examples, an original set of n parties of the joint decrypting server 602 may use a threshold-multi-key encryption scheme to train a joint model M (not shown). The joint model M may be encrypted using the threshold-multi-key encryption scheme to generate encrypted shared model M' 608. In various examples, the multiple parties corresponding to joint decrypting server 602 can train the shared joint model M over their private data using a threshold-FHE scheme.

In various examples, an unlimited set of new users corresponding to user devices 604 can then ask to evaluate the shared model over their own private data 614. For example, the original parties may send the encrypted shared model 608 and the set of evaluation public keys 606 to the user devices 604.

When a new user of one of the user devices 604 wishes to use this model to infer on its own private data 614, the user device 604 computes the inference over the encrypted shared model M' 608 to get an encrypted result R (not shown). In particular, the user devices 604 can compute the encrypted inference over the private data 614 using different evaluation public keys 606 corresponding to different operations to generate the encrypted result R.

The user devices 604 can then obtain a decrypted inference by using a secure Privacy-Preserving Masking Service where the initial parties are the joint decrypting server 602. For example, all the n original parties must take part in decrypting R. The new user device 604 may accordingly mask R to generate masked encrypted inference 610 and send the masked encrypted inference 610 to the joint decrypting server 602 and receive the masked decrypted inference. In some examples, the masking may also involve homomorphic computations that may use one or more of the of the evaluation public keys. Moreover, this may be executed without the n parties being able to maliciously learn nor modify the result encrypted by R. In this manner, the user device 604 learns the inference but not the encrypted shared model 608 nor the data used to train the encrypted shared model 608. The initial parties of the joint decrypting server 602 do not learn anything, including anything about the user's private data 614 nor the unmasked decrypted inference 614.

It is to be understood that the block diagram of FIG. 6 is not intended to indicate that the system 600 is to include all of the components shown in FIG. 6. Rather, the system 600 can include fewer or additional components not illustrated in FIG. 6 (e.g., additional user devices, or additional public keys, encrypted shared models, masked encrypted inferences, etc.).

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
    one or more processors, one or more computer-readable memories and one or more computer-readable storage media;
    program instructions, stored on at least one of the one or more storage media for execution by at least one of the one or more processors via at least one of the one or more memories, to mask a ciphertext using four random elements to generate a plurality of masked ciphertexts;
    program instructions, stored on at least one of the one or more storage media for execution by at least one of the one or more processors via at least one of the one or more memories, to send the plurality of masked ciphertexts to a server device;
    program instructions, stored on at least one of the one or more storage media for execution by at least one of the one or more processors via at least one of the one or more memories, to receive a plurality of masked plaintexts from the server device;
    program instructions, stored on at least one of the one or more storage media for execution by at least one of the one or more processors via at least one of the one or more memories, to unmask the plurality of masked plaintexts using the four random elements to generate a plurality of unmasked plaintexts; and
    program instructions, stored on at least one of the one or more storage media for execution by at least one of the one or more processors via at least one of the one or more memories, to verify the plurality of unmasked plaintexts by comparing the plurality of unmasked plaintexts with each other.

2. The computer system of claim 1, wherein the program instructions to verify the plurality of unmasked plaintexts use a multiplicative inverse of a subset of the four random elements.

3. The computer system of claim 1, further comprising:
    program instructions, stored on at least one of the one or more storage media for execution by at least one of the one or more processors via at least one of the one or more memories, to receive an encrypted model; and
    program instructions, stored on at least one of the one or more storage media for execution by at least one of the one or more processors via at least one of the one or more memories, to generate an encrypted quality score comprising the ciphertext via the encrypted model on user data using an evaluation public key.

4. The computer system of claim 1, further comprising:
    program instructions, stored on at least one of the one or more storage media for execution by at least one of the one or more processors via at least one of the one or more memories, to receive an evaluation public key and an encrypted model;
    program instructions, stored on at least one of the one or more storage media for execution by at least one of the one or more processors via at least one of the one or more memories, to generate an inference via the encrypted model on private data using the evaluation public key; and
    program instructions, stored on at least one of the one or more storage media for execution by at least one of the one or more processors via at least one of the one or more memories, to mask the encrypted inference to generate the ciphertext.

5. The computer system of claim 4, wherein the encrypted model comprises an encrypted shared model.

6. The computer system of claim 4, wherein the encrypted shared model is encrypted using a threshold-multi-key encryption scheme.

7. A computer-implemented method, comprising:
    masking, via a processor, a ciphertext using four random elements to generate a plurality of masked ciphertexts;
    sending, via the processor, the plurality of masked ciphertexts to a server device;
    receiving, via the processor, a plurality of masked plaintexts from the server device;
    unmasking, via the processor, the plurality of masked plaintexts using the four random elements to generate a plurality of unmasked plaintexts; and
    verifying, via the processor, the plurality of unmasked plaintexts by comparing the plurality of unmasked plaintexts with each other.

8. The computer-implemented method of claim 7, comprising verifying, via the processor, the plurality of unmasked plaintexts using a multiplicative inverse of a subset of the four random elements.

9. The computer-implemented method of claim 7, comprising:
    receiving, via the processor, an encrypted model; and
    generating, via the processor, an encrypted quality score comprising the ciphertext via the encrypted model on user data using an evaluation public key.

10. The computer-implemented method of claim 7, comprising:
    receiving, via the processor, a public key and an encrypted model;
    generating, via the processor, an inference via the encrypted model on private data using an evaluation public key; and masking, via the processor, the encrypted inference to generate the ciphertext.

11. The computer-implemented method of claim 10, wherein the encrypted model comprises an encrypted shared model.

12. The computer-implemented method of claim 11, wherein the encrypted shared model is encrypted using a threshold-multi-key encryption scheme.

13. A computer program product for masking ciphertexts, the computer program product comprising a computer-readable storage medium having program code embodied therewith, the program code executable by a processor to cause the processor to:
    mask a ciphertext using four random elements to generate a plurality of masked ciphertexts;
    send the plurality of masked ciphertexts to a server device;
    receive a plurality of masked plaintexts from the server device; and
    unmask the plurality of masked plaintexts using the four random elements to generate a plurality of unmasked plaintexts; and
    verify the plurality of unmasked plaintexts by comparing the plurality of unmasked plaintexts with each other.

14. The computer program product of claim 13, further comprising program code executable by the processor to verify the plurality of unmasked plaintexts using a multiplicative inverse of a subset of the four random elements.

15. The computer program product of claim 13, further comprising program code executable by the processor to:
    receive an encrypted model; and
    generate an encrypted quality score comprising the ciphertext via the encrypted model on user data using an evaluation public key.

16. The computer program product of claim 13, further comprising program code executable by the processor to:
    receive an evaluation public key and an encrypted model; and
    generate an encrypted inference comprising the ciphertext via the encrypted model on private data using the evaluation public key.

17. The computer program product of claim 16, wherein the encrypted model comprises an encrypted shared model.

* * * * *